(12) United States Patent
Abe

(10) Patent No.: US 9,128,559 B2
(45) Date of Patent: Sep. 8, 2015

(54) ELECTRONIC DEVICE

(75) Inventor: Noboru Abe, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 117 days.

(21) Appl. No.: 13/535,177

(22) Filed: Jun. 27, 2012

(65) Prior Publication Data

US 2013/0002581 A1    Jan. 3, 2013

(30) Foreign Application Priority Data

Jun. 28, 2011    (JP) ................................ 2011-142484

(51) Int. Cl.
*G06F 3/041* (2006.01)

(52) U.S. Cl.
CPC ................... *G06F 3/0416* (2013.01)

(58) Field of Classification Search
CPC ............................ G06F 3/0488; G06F 3/0416
USPC ........................................................ 345/173
See application file for complete search history.

(56) References Cited

U.S. PATENT DOCUMENTS

| | | | |
|---|---|---|---|
| 2004/0150631 A1* | 8/2004 | Fleck et al. | 345/179 |
| 2005/0030292 A1 | 2/2005 | Diederiks | |
| 2005/0259087 A1* | 11/2005 | Hoshino et al. | 345/173 |
| 2006/0132457 A1* | 6/2006 | Rimas-Ribikauskas et al. | 345/173 |
| 2008/0024459 A1* | 1/2008 | Poupyrev et al. | 345/173 |
| 2009/0046110 A1* | 2/2009 | Sadler et al. | 345/660 |
| 2010/0017710 A1 | 1/2010 | Kim et al. | |
| 2011/0057903 A1 | 3/2011 | Yamano et al. | |
| 2011/0181539 A1 | 7/2011 | Aono | |
| 2012/0032907 A1* | 2/2012 | Koizumi et al. | 345/173 |

FOREIGN PATENT DOCUMENTS

| | | | |
|---|---|---|---|
| JP | 11-119882 A | | 4/1999 |
| JP | 2005-512241 A | | 4/2005 |
| JP | 2010-152736 A | | 7/2010 |
| JP | 2011-059821 A | | 3/2011 |

OTHER PUBLICATIONS

An Office Action; "Notice of Reasons for Rejection," issued by the Japanese Patent Office on Apr. 14, 2015, which corresponds to Japanese Patent Application No. 2012-141438 and is related to U.S. Appl. No. 13/535,177; with English language statement of relevance.

* cited by examiner

*Primary Examiner* — Viet Pham
(74) *Attorney, Agent, or Firm* — Studebaker & Brackett PC

(57) ABSTRACT

The electronic device for executing the predetermined operation based on the press includes a control unit configured to set an execution standard for executing the predetermined operation based on the pressure data and a cancellation standard for canceling the predetermined operation. The control unit sets the cancellation standard to be higher than the execution standard. Also, the control unit sets a plurality of execution standards for executing predetermined operations based on the pressure data and a cancellation standard for canceling the predetermined operations associated with the plurality of execution standards.

9 Claims, 6 Drawing Sheets

ELECTRONIC DEVICE

CROSS REFERENCE TO RELATED APPLICATION

This application claims priority to and the benefit of Japanese Patent Application No. 2011-142484 filed on Jun. 28, 2011, the entire contents of which are incorporated herein by reference.

FIELD

Embodiments discussed herein relate to an electronic device having a contact detection unit.

BACKGROUND

Lately, the electronic devices having the contact detection unit such as a touch sensor have been increasingly used for mobile terminals such as mobile phones. As a method to detect a contact by an operator, there are known variety of types, such as a resistive film type, a capacitive type, an optical type and the like. Those types detect the contact by a contact object such as an operator's finger, a stylus pen and the like. As the electronic device having the contact detection unit, a touch panel having the contact detection unit and a display unit laminated to each other has been known. In the touch panel, the display unit is disposed on a rear face of the contact detection unit and displays graphical images of characters and buttons (objects) of buttons and the like. When the operator presses the object displayed on the display unit, the contact detection unit detects a contact at a pushed position. A technique to provide a tactile sensation to the operator in response to pressing with a predetermined pressure load or higher has also been known.

Incidentally, there are electronic devices that execute predetermined operations based on the pressure loads. Japanese Patent Laid-Open JP11-119882A, for example, discloses a key input apparatus enabling selection of a plurality of characters assigned to one key based on the pressure load.

According to the technique disclosed in JP11-119882A, however, when the operator, for example, presses down a key assigned Japanese characters in an "A" row by mistake despite an intention to operate a key assigned Japanese characters in a "KA" row, the operator needs to remove the finger from the key assigned the "A" row and press another key such as a "cancel key" to correct an input character. Therefore, the number of times to touch the key is increased and thus operability is deteriorated. Accordingly, it has been desired to improve the operability in an erroneous operation when a predetermined operation is executed based on the pressure load.

SUMMARY

In one embodiment, an electronic device for executing a predetermined operation based on a press according to an embodiment includes a control unit configured to set an execution standard for executing the predetermined operation based on the press and a cancellation standard for canceling the predetermined operation.

According to the embodiment, the control unit sets the cancellation standard to be higher than the execution standard.

According to the embodiment, the electronic device includes a press detection unit configured to detect the press, wherein the control unit sets a plurality of execution standards and a plurality of cancellation standards and, when the data based on the press detected by the press detection unit satisfies a first execution standard, a second execution standard higher than the first execution standard and the cancellation standard for canceling a predetermined operation associated with the second execution standard and then decreases without satisfying a third execution standard higher than the second execution standard and the cancellation standard, controls to execute a predetermined operation associated with the first standard.

Further, an electronic device for executing a predetermined operation based on a press according to another embodiment includes a control unit configured to set a plurality of execution standards for executing predetermined operations based on data based on a detected press and a cancellation standard for canceling the predetermined operations associated with the plurality of execution standards.

DESCRIPTION OF EMBODIMENTS

Embodiments discussed herein provide an electronic device for executing a predetermined operation based on the data based on a detected press which may improve the operability in the erroneous operation.

According to the embodiments, the electronic device for executing the predetermined operation based on the data based on the detected press may improve operability in an erroneous operation.

The embodiments (hereinafter, referred to as first-third embodiments will be described with reference to the accompanying drawings.

Configuration of First Embodiment

Figure 1:
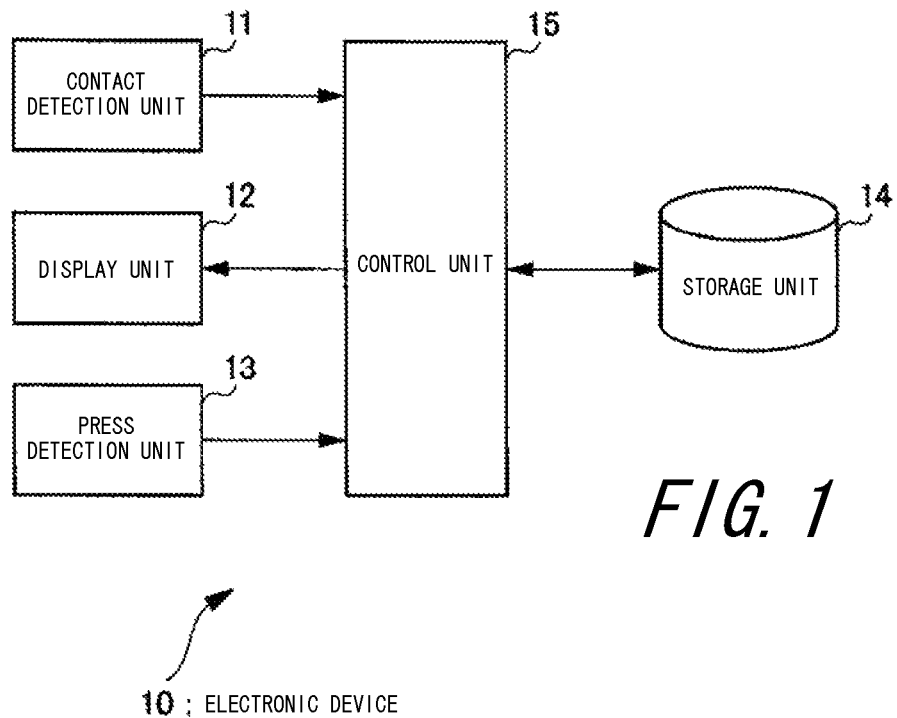
FIG. 1 is a block diagram illustrating a configuration of an electronic device according to the first embodiment.

FIG. 1 is a block diagram illustrating a configuration of an electronic device according to the first embodiment. As illustrated in FIG. 1, an electronic device 10 according to the first embodiment includes a contact detection unit 11, a display unit 12, a press detection unit 13, a storage unit 14 and a control unit 15.

The contact detection unit 11 is normally disposed on a front face of the display unit 12 and, on an input face of the contact detection unit 11, detects a contact to and release from objects displayed on the display unit 12 by a contact object such as a user's finger or a stylus pen. Also, the contact detection unit 11 detects a contact position on the input face and outputs the detected contact position to the control unit 15. The contact detection unit 11 may be of a known type such as, for example, a resistive film type, a capacitive type, an optical type or the like. When the contact detection unit 11 is of the optical type, since the contact detection unit 11 detects a position where infrared rays are blocked by the contact object, the contact detection unit 11 does not need a physical contact of the contact object in order to detect a contact. That is, the contact detection unit 11 may also detect a contact other than the physical contact.

The display unit 12 displays graphical images of the objects such as characters and a map. The display unit 12 may be constituted by using, for example, a liquid crystal display (LCD) or an organic electroluminescence display (OELD).

The contact detection unit 11 and the display unit 12 may be integrally formed. Such a device having both functions of the contact detection unit 11 and the display unit 12 may have a configuration in which a plurality of photoelectric conversion elements such as photodiodes are orderly mixed in a group of pixel electrodes arranged in a matrix pattern in the liquid crystal panel. This integrated device may display the image in a structure of the liquid crystal panel and also detect the contact position by nearby photoelectric conversion elements that receive backlight of the liquid crystal display reflected by a tip of a pen in contact with a desired position on the face of the panel.

The press detection unit 13 detects a press on the input face of the contact detection unit 11. The press detection unit 13 is constituted by using, for example, a strain gauge sensor or a piezoelectric element and the like, which reacts to a press. If constituted by using a piezoelectric element, the electric property such as voltage (voltage value, or, press-based data hereafter) of the piezoelectric element of the press detection unit 13 changes along the magnitude of the load (force) applied to the press on the touch detect unit 11, or the change ratio (acceleration) of the load (force). The press detection unit 13 outputs the data based on the detected press (press-based data) on the input face to the control unit 15. The press detection unit 13 may be constituted according to a detection scheme of the contact detection unit 11. For the resistive film type, for example, the press detection unit may be constituted without using the strain gauge sensor if the press-based data may be detected from a change of an output signal based on a resistance change in accordance with a change of a contact area. For the capacitive type, alternatively, the press detection unit may be constituted without using the strain gauge sensor if the press-based data may be detected from the change of the output signal based on the magnitude of a capacitance (electrical charge) change in accordance with a change of a contact area. That is, the press detection unit 13 may also function as the contact detection unit 11 and as the control unit 15, since the press detection unit detects data based on a change of the output signal from the contact detection unit 11. Or, the function of the press detection unit 13 may be substantialized by a combination of the contact detection unit 11 and the control unit 15.

The storage unit 14 may be constituted by using a semiconductor memory or the like and stores various information and programs for operating the electronic device 10, as well as functioning as a work memory. According to the first embodiment, the storage unit 14 stores, for example, an execution standard set for execution of a predetermined operation based on the press-based data and a cancellation standard set for canceling the predetermined operation.

The control unit 15 has a function to set the execution standard for executing the predetermined operation based on the press-based data and the cancellation standard for canceling the predetermined operation. The cancellation standard is set to be higher than the execution standard. The control unit 15 may set the execution standard and the cancellation standard either prior to or dynamically during execution of any operation. The execution standard and cancellation standards set by the control unit 15 are stored in a predetermined area of the storage unit 14.

As an example of a predetermined operation, there is a "magnifying map application" which, when a map is displayed full screen on the display unit 12 and pressed down at any position on the map, partially enlarges the map and, when the map is further pressed down and subsequently the finger is released, restores the original view of the map in full screen. In this case, the execution standard functions as a threshold at which the control unit 15 controls to display a magnified view of the map, and the cancellation standard functions as a threshold at which the control unit 15 controls to restore the original view of the map in full screen.

The control unit 15 executes a predetermined operation when the press-based data satisfies the execution standard, and executes an operation to cancel the predetermined operation when the press-based data satisfies the cancellation standard. Here, "when the press-based data satisfies the execution standard" may be, for example, by using the standard for executing the predetermined operation as an execution threshold, "when the data based on a press detected by the press detection unit 13 is equal to or higher than the execution threshold" or "when the data based on a press detected by the press detection unit 13 exceeds the execution threshold". Similarly, "when the press-based data does not satisfy the execution standard" may be, for example, by using the standard for executing the predetermined operation as a threshold, "when the data based on a press detected by the press detection unit 13 is equal to or lower than the threshold" or "when the data based on a press detected by the press detection unit 13 exceeds the threshold and then falls therebelow".

Further, "when the data based on a press satisfies the cancellation standard" may be, for example, by using the standard for canceling the predetermined operation as a cancellation threshold, "when the data based on a press detected by the press detection unit 13 is equal to or higher than the cancellation standard" or "when the data based on a press detected by the press detection unit 13 exceeds the cancellation standard". Similarly, "when the data based on a press does not satisfy the cancellation standard" may be, for example, by using the standard for canceling the predetermined operation as the cancellation threshold, "when the data based on a press detected by the press detection unit 13 is equal to or lower than the cancellation threshold" or "when the data based on a press detected by the press detection unit 13 exceeds the cancellation threshold and then falls therebelow".

The "execution standard" and the "cancellation standard" of the electronic device 10 according to the first embodiment will be described with reference to a graph in FIG. 2. In input operation to the input face of the contact detection unit 11, the user generally continues to increase a pressure on the input face upon touching the input face until determining that the input is received. That is, the user presses down the input face. Here, based on a change of a display of the display unit 12 or a tactile sensation provided to an operator's finger or the like by a tactile sensation providing unit (not illustrated), for example, the user determines that the input operation is received. When an operation performed in response to reception of the input operation differs from an intended operation, the operator further increases the pressure to cancel the operation. After the operation is canceled in response to the increased pressure, the operator reduces the pressure on the input face to perform a next operation. That is, the operator performs a release operation by removing the finger from the input face. Accordingly, the data based on a press detected by the press detection unit 13 follows a curved line in FIG. 2. That is, the press-based data gradually increases upward to the right satisfying first the standard indicated by a solid line in the figure and next the cancellation standard indicated by a dotted line, reaches a maximum and then decreases passing the cancellation standard again to become zero in the end.

Operation of First Embodiment

Figure 2:
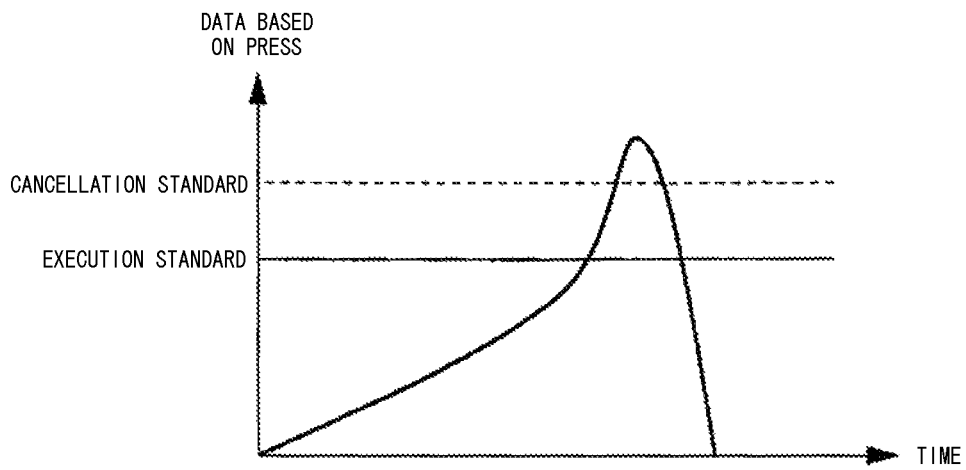
FIG. 2 is a graph illustrating an execution standard and a cancellation standard used by the electronic device according to the first embodiment.
Figure 3:
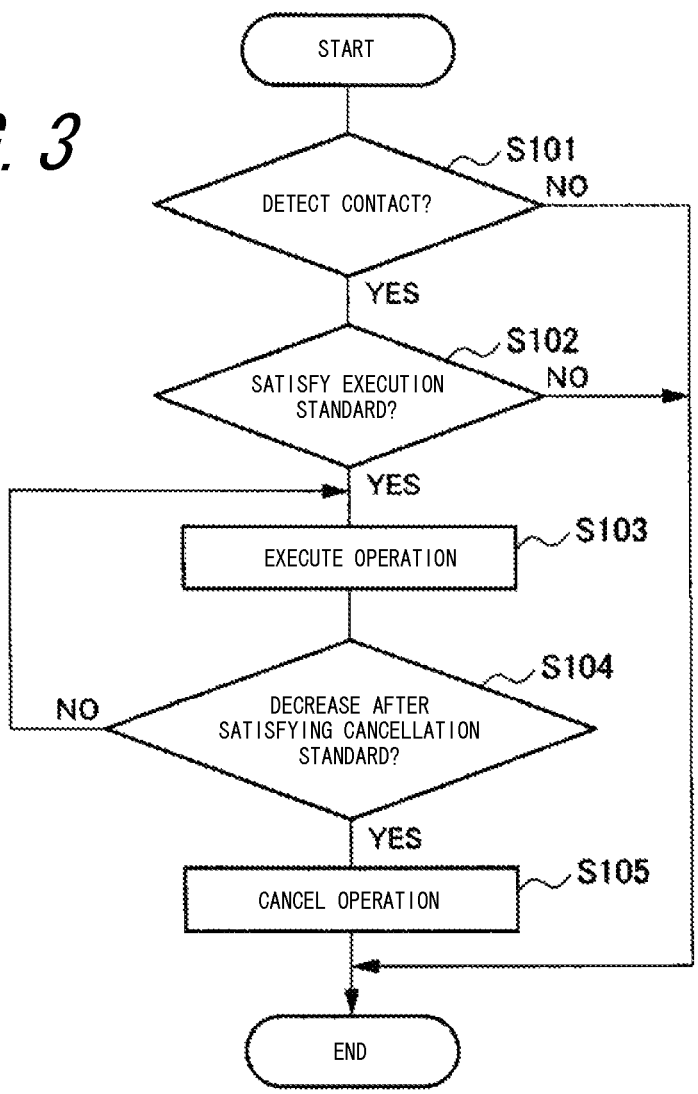
FIG. 3 is a flowchart illustrating an operation of the electronic device according to the first embodiment.

The following is a detailed description of the operation of the electronic device 10 according to the first embodiment illustrated in FIG. 1 and FIG. 2, with reference to a flowchart in FIG. 3. Here, it is assumed that the map is already displayed in full screen on the display unit 12.

First, when the operator contacts the input face of the contact detection unit 11, the contact detection unit 11 detects the contact and outputs position information about a coordinate in a contact area to the control unit 15. The contact detection unit 11 may output position information about a coordinate of a center of gravity of the contact area.

When the control unit 15 detects the contact by obtaining the position information (YES at step S101), the control unit 15 retrieves the execution standard set for displaying the magnified view of the map from the storage unit 14 and compares the execution standard and the data based on a press detected by the press detection unit 13 at predetermined intervals. Next, the control unit 15 determines whether the data based on a press detected by the press detection unit 13 satisfies the execution standard (step S102). When it is determined that the press-based data satisfies the execution standard (YES at step S102), the control unit 15 executes a magnifying operation by generating magnified map information centering on the position information obtained from the contact detection unit 11 and has the display unit 12 display the magnified view of the map (step S103). On the other hand, when the detected press-based data does not satisfy the execution standard (NO at step S102), no further operation is executed and the map is maintained in full screen on the display unit 12.

It is assumed that, after the magnified view of the map is displayed, the operator further applies the pressure intending to cancel the magnifying operation, that is, intending to display the original view of the map in full screen. At this time, the control unit 15 compares the cancellation standard retrieved from the storage unit 14 and the data based on a press detected by the press detection unit 13 at predetermined intervals. Here, the control unit 15 determines whether the detected press-based data satisfies the cancellation standard (step S104). When it is determined that the detected press-based data satisfies the cancellation standard (YES at step S104), the control unit 15 cancels a display of the magnified map and has the display unit 12 display the original view of the map in full screen (step S105). On the other hand, when it is determined that the detected press-based data does not satisfy the cancellation standard (NO at step S104), the control unit 15 returns to step S103 and maintains the magnified view of the map on the display unit 12.

According to the electronic device 10 of the first embodiment, as described above, the control unit 15 sets the execution standard for executing the predetermined operation based on the press-based data and the cancellation standard, which is higher than the execution standard, for canceling the predetermined operation. Then, when the control unit 15 detects a contact to the input face of the contact detection unit 11 by the operator, the control unit 15 determines whether the data based on a press detected by the press detection unit 13 satisfies the execution standard retrieved from the storage unit 14. When the detected press-based data satisfies the execution standard, the control unit 15 executes the predetermined operation and further determines whether an increased data based on a press detected by the press detection unit 13 satisfies the cancellation standard retrieved from the storage unit 14. When the detected increased press-based data satisfies the cancellation standard, the control unit 15 executes the operation to cancel the predetermined operation.

As such, in order to cancel the operation, the operator does not need to perform any other operation than applying the press-based data satisfying the cancellation standard. Accordingly, the number of times to touch for canceling the predetermined operation is reduced and thus operability is improved.

Configuration of Second Embodiment

Figure 4:
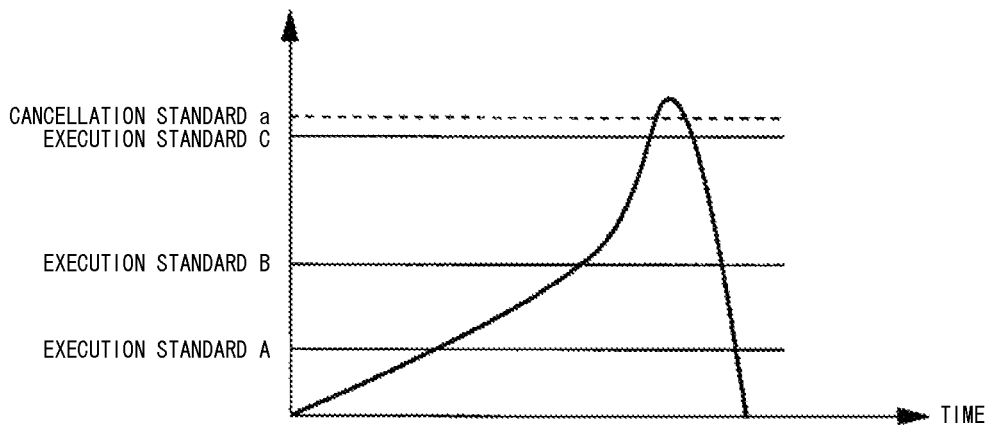
FIG. 4 is a graph illustrating execution standards and a cancellation standard used by the electronic device according to a second embodiment.

FIG. 4 is a graph indicating execution standards A, B and C and a cancellation standard a set by the electronic device 10 according to the second embodiment. An electronic device 10B according to the second embodiment is different from the electronic device 10 of the first embodiment illustrated in FIG. 2 in the sense that an execution standard B for executing an operation B and an execution standard C for executing an operation C are set in addition to the execution standard A for executing an operation A. However, one cancellation standard is set here, in the same manner as the first embodiment, as the cancellation standard a. Accordingly, when the map magnifying display application is used as an example in the same manner as the first embodiment, the map may be magnified at three magnification ratios based on the execution standards A, B and C (A<B<C), and all of the operations A, B and C are canceled when the press-based data satisfies the cancellation standard a.

In order to realize the above functions, the control unit 15 sets a plurality of execution standards for executing predetermined operations based on the press-based data and one cancellation standard for canceling the predetermined operations. In detail, the control unit 15 sets the execution standards A, B and C and the cancellation standard a and, when the data based on a press detected by the press detection unit 13 satisfies the cancellation standard a for canceling the operations respectively associated with the execution standard A, the execution standard B higher than the execution standard A and the execution standard C higher than the execution standard B, the control unit 15 controls to execute an operation to cancel all of the predetermined operations respectively associated with the execution standards A, B and C. The execution standards A, B and C and the cancellation standard a are stored in the predetermined area of the storage unit 14. Other configurations are similar to those of the first embodiment illustrated in FIG. 1.

Operation of Second Embodiment

Figure 5:
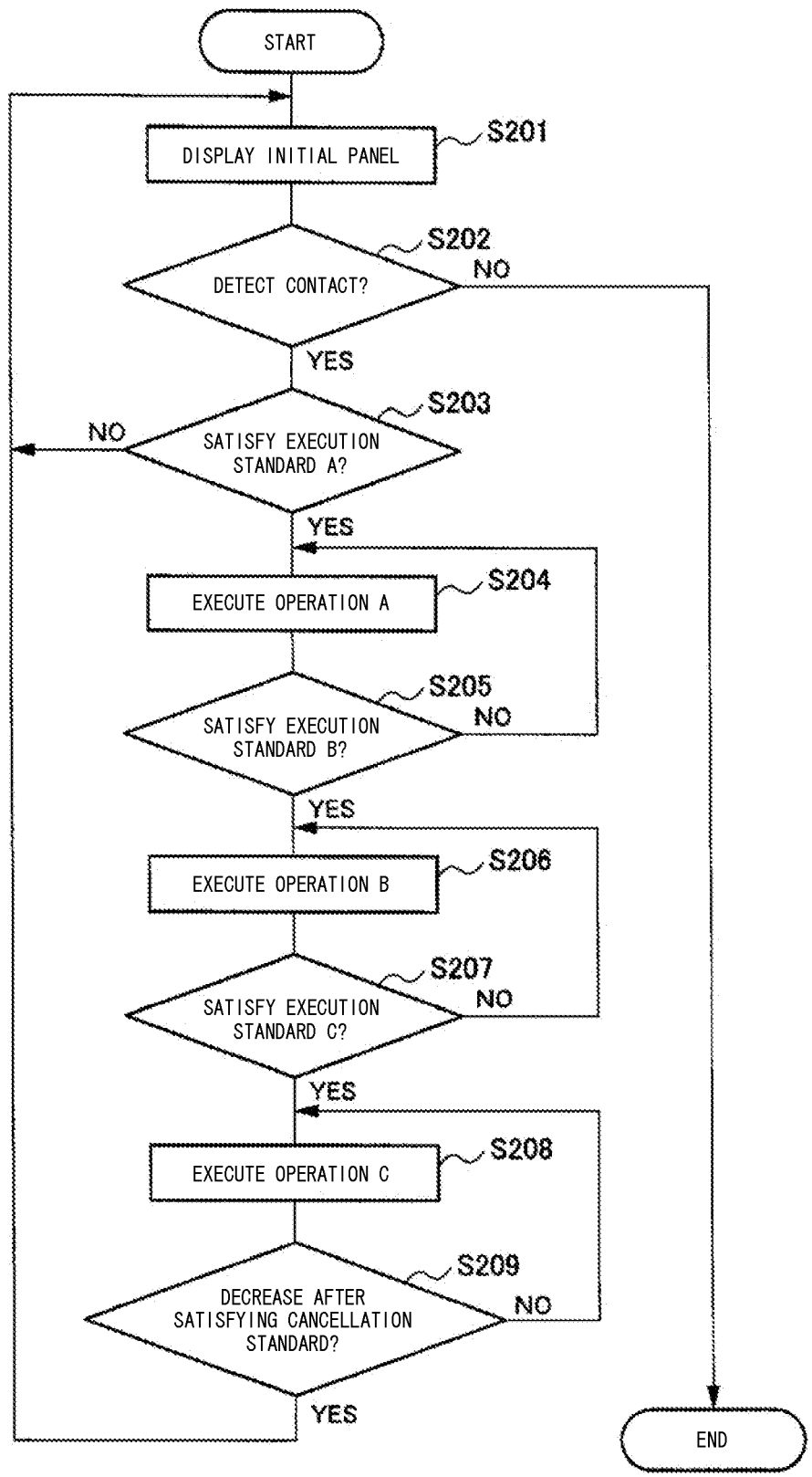
FIG. 5 is a flowchart illustrating an operation of the electronic device according to the second embodiment.

The following is a detailed description of an operation of the electronic device 10B according to the second embodiment with reference to a flowchart illustrated in FIG. 5.

Here, it is assumed that the map is displayed in full screen, as an initial view, on the display unit 12 (step S201). In this state, when the operator contacts the input face of the contact detection unit 11, the contact detection unit 11 detects the contact and outputs the position information about the coordinate in the contact area to the control unit 15. When the control unit 15 detects the contact by obtaining the position information (YES at step S202), the control unit 15 retrieves the execution standard A (A<B<C) set for gradual magnification of the map from the storage unit 14 and compares the execution standard A and the data based on a press detected by the press detection unit 13 at predetermined intervals.

Next, the control unit 15 determines whether the data based on a press detected by the press detection unit 13 satisfies the execution standard A (step S203). When it is determined that the detected press-based data satisfies the execution standard A (YES at step S203), the control unit 15 executes the operation A for magnifying the map at a preset magnification ratio A (A<B<C) by generating magnified map information at the magnification ratio A centering on the position information obtained from the contact detection unit 11 and has the display unit 12 display a magnified view of the map at the magnification ratio A (step S204). On the other hand, when the detected press-based data does not satisfy the execution standard A (NO at step S203), no further operation is executed and the map is maintained in full screen on the display unit 12.

Subsequently, it is assumed that, after the magnified view of the map at the magnification ratio A is displayed on the display unit 12, the operator further presses the input face intending to further magnify the map. At this time, when the control unit 15 detects a further contact to the input face of the contact detection unit 11, the control unit 15 retrieves the execution standard B set for the gradual magnification of the map from the storage unit 14 and compares the execution standard B and the data based on a press detected by the press detection unit 13 at predetermined intervals. Then, the control unit 15 determines whether the data based on a press detected by the press detection unit 13 satisfies the execution standard B stored in the storage unit 14 (step S205). When it is determined that the detected press-based data satisfies the execution standard B (YES at step S205), the control unit 15 executes the operation B for magnifying the map at a preset magnification ratio B by generating magnified map information at the magnification ratio B centering on the position information obtained from the contact detection unit 11 and has the display unit 12 display a magnified view of the map at the magnification ratio B (step S206).

On the other hand, when it is determined that the detected press-based data does not satisfy the execution standard B (NO at step S205), the control unit 15 returns to step S204 and maintains the magnified view of the map at the magnification ratio A on the display unit 12.

Subsequently, it is assumed that, after the magnified view of the map at the magnification ratio B is displayed on the display unit 12, the operator further presses the input face intending to further magnify the map. At this time, when the control unit 15 detects a further contact detected by the contact detection unit 11, retrieves the execution standard C set for the gradual magnification of the map from the storage unit 14 and compares the execution standard C and the data based on a press detected by the press detection unit 13 at predetermined intervals. Then, the control unit 15 determines whether the data based on a press detected by the press detection unit 13 satisfies the execution standard C stored in the storage unit 14 (step S207). When it is determined that the detected press-based data satisfies the execution standard C (YES at step S207), the control unit 15 executes the operation C for magnifying the map at a preset magnification ratio C by generating magnified map information at the magnification ratio C centering on the position information obtained from the contact detection unit 11 and has the display unit 12 display a magnified view of the map at the magnification ratio C (step S208).

On the other hand, when it is determined that the detected press-based data does not satisfy the execution standard C (NO at step S207), the control unit 15 returns to step S206 and maintains the magnified view of the map at the magnification ratio B on the display unit 12.

Next, it is assumed that the operator further presses the input face intending to cancel the magnifying operation, that is, to restore the original view of the map in full screen. At this time, the control unit 15 compares the cancellation standard a retrieved from the storage unit 14 and the data based on a press detected by the press detection unit 13 at predetermined intervals. Here, the control unit 15 determines whether the detected press-based data satisfies the cancellation standard a (step S209). When it is determined that the detected press-based data satisfies the cancellation standard a (YES at step S209), the control unit 15 executes an operation to cancel a display of the map magnified at the magnification ratio C and restores the original view of the map in full screen (step S201), which is before gradually magnified in the operations A, B and C, on the display unit 12.

On the other hand, when it is determined that the detected press-based data does not satisfy the cancellation standard a (NO at step S209), the control unit 15 returns to step S208 and maintains the magnified view of the map at the magnification ratio C on the display unit 12.

According to the electronic device 10 of the second embodiment, as described above, the control unit 15 sets the plurality of execution standards A, B and C for executing the predetermined operations based on the press-based data, as well as the cancellation standard a for canceling all of the predetermined operations. Then, when the control unit 15 detects a contact to the input face of the contact detection unit 11 by the operator, the control unit 15 sequentially determines whether the data based on a press detected by the press detection unit 13 satisfies the execution standards A, B and C. When the press-based data satisfies each of the execution standards, the control unit 15 executes the operation associated therewith. Then, when the press-based data further increases, the control unit 15 determines whether the data based on a press detected by the press detection unit 13 satisfies the cancellation standard a. When the press-based data satisfies the cancellation standard a, the control unit 15 executes the operation to cancel all of the operations A, B and C.

Therefore, in order to cancel the operations, the operator does not need to perform any other operation than applying the press-based data satisfying the cancellation standard a. Accordingly, the number of times to touch for canceling the operation is reduced and thus the operability is improved. Moreover, since a plurality of execution standards are set for executing predetermined operations based on the press-based data, in magnifying operation of the map, for example, a single touch allows both of forward operations for gradual magnification and a backward operation for reduction. Thereby, the operability may be further improved.

Configuration of Third Embodiment

Figure 6:
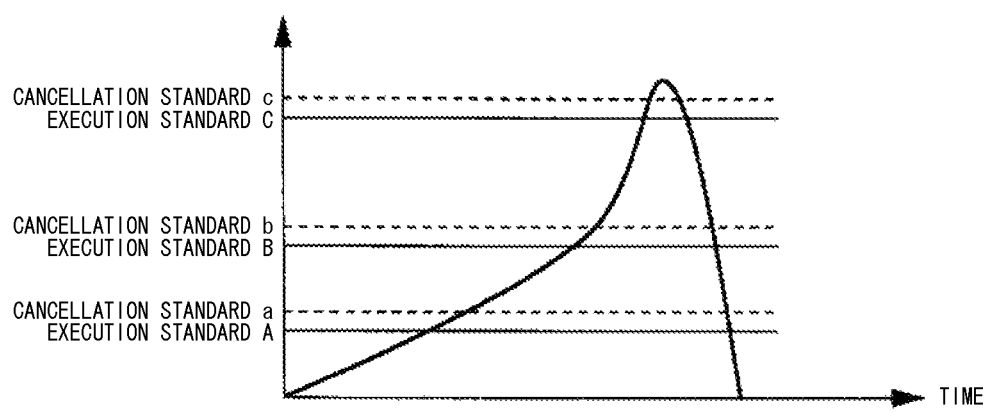
FIG. 6 is a graph illustrating execution standards and cancellation standards used by the electronic device according to the third embodiment.

FIG. 6 is a graph illustrating the execution standards and cancellation standards set by an electronic device 10C according to the third embodiment. The electronic device 10 according to the third embodiment is different from the electronic device of the second embodiment illustrated in FIG. 4 in the sense that the cancellation standard is set for each of the execution standards. Accordingly, the operation A executed when the execution standard A is satisfied is canceled when the press-based data, after satisfying a cancellation standard a, decreases without satisfying the execution standard B. Also, the operation B executed when the execution standard B is satisfied is canceled when the press-based data, after satisfying a cancellation standard b, decreases without satisfying the execution standard C. The operation C executed when the execution standard C is satisfied is canceled when the press-based data decreases after satisfying a cancellation standard c.

Cancellation of the operations A, B and C may be executed at any of the following timings: (1) immediately after the data based on a press detected by the press detection unit 13 decreases after satisfying each of the cancellation standards, (2) at a point when the press-based data further decreases to become lower than the cancellation standard, or (3) when the finger is released from the input face of the contact detection unit 11.

The control unit 15 sets a plurality of execution standards for executing predetermined operations based on the press-based data, as well as a plurality of cancellation standards for canceling each of the predetermined operations. In detail, the control unit 15 sets the execution standards A, B and C and the cancellation standards a, b and c associated with the execution standards A, B and C, respectively. When the data based on a press detected by the press detection unit 13 satisfies the execution standard A, the execution standard B higher than the execution standard A and the cancellation standard b for canceling the predetermined operation associated with the execution standard B and then decreases without satisfying the execution standard C higher than the execution standard B, the control unit 15 controls to execute the predetermined operation associated with the standard A. The execution standards A, B and C and the cancellation standards a, b and c are stored in the predetermined area of the storage unit 14. Other configurations are similar to those of the first embodiment illustrated in FIG. 1.

Operation of Third Embodiment

Figure 7:
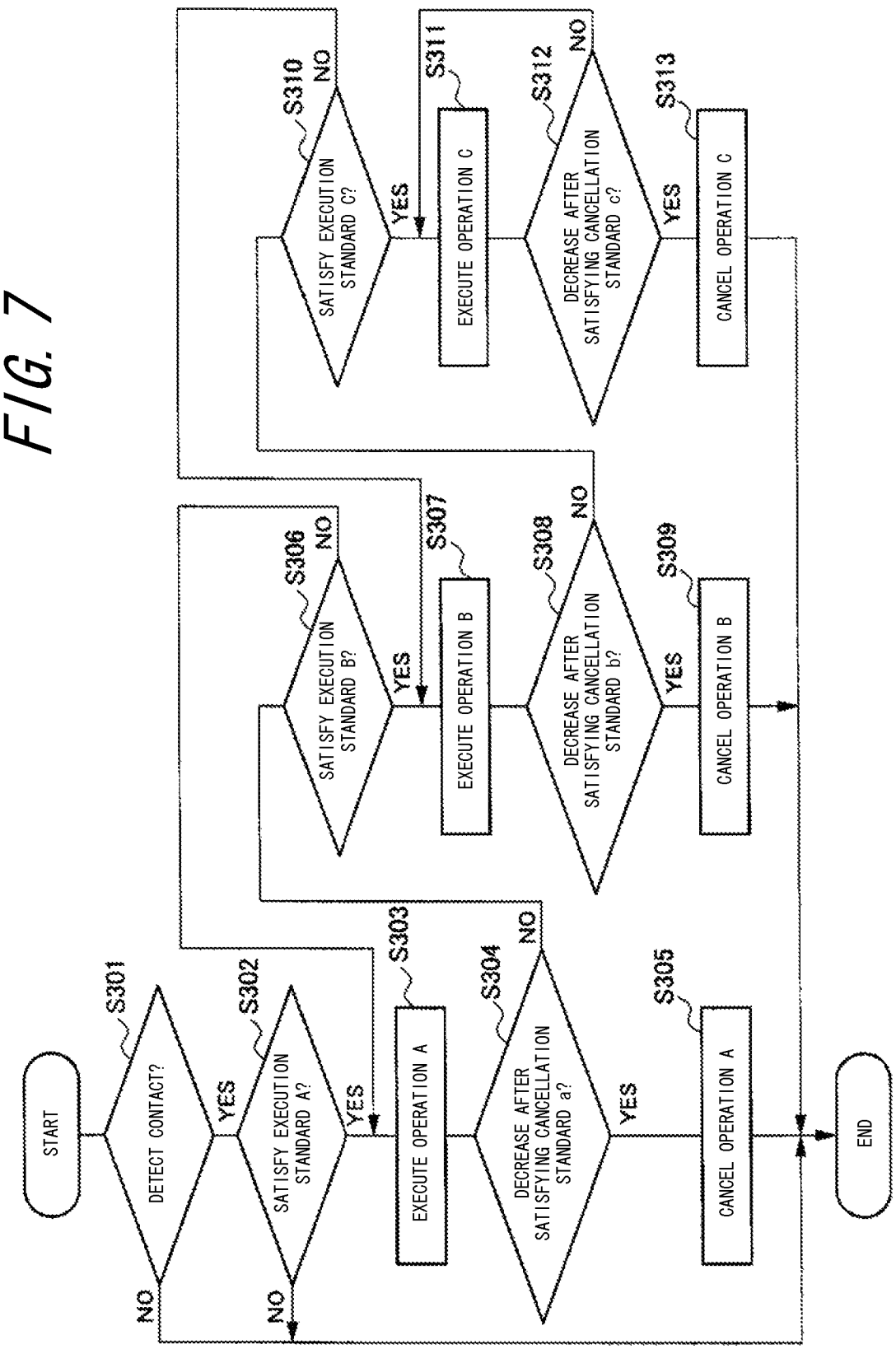
FIG. 7 is a flowchart illustrating an operation of the electronic device according to the third embodiment.

The following is a detailed description of an operation of the electronic device 10 according to the third embodiment with reference to a flowchart illustrated in FIG. 7. Here, it is assumed that the map is already displayed in full screen on the display unit 12.

In this state, when the operator contacts the input face of the contact detection unit 11, the contact detection unit 11 detects the contact and outputs the position information about the coordinate in the contact area to the control unit 15. When the control unit 15 detects the contact by obtaining the position information (YES at step S301), the control unit 15 retrieves from the storage unit 14 the execution standard A (A<B<C) set for gradual magnification of the map and compares the execution standard A and the data based on a press detected by the press detection unit 13 at predetermined intervals.

Next, the control unit 15 determines whether the data based on a press detected by the press detection unit 13 satisfies the execution standard A (step S302). When it is determined that the detected press-based data satisfies the execution standard A (YES at step S302), the control unit 15 executes the operation A for magnifying the map at the preset magnification ratio A (A<B<C) by generating magnified map information at the magnification ratio A centered on the position information obtained from the contact detection unit 11 and has the display unit 12 display the magnified view of the map at the magnification ratio A (step S303). On the other hand, when the detected press-based data does not satisfy the execution standard A (NO at step S302), no further operation is executed and the map is maintained in full screen on the display unit 12.

Subsequently, it is assumed that the operator further presses the input face intending to cancel the operation A. At this time, the control unit 15 compares the cancellation standard a and the execution standard B, both of which are retrieved from the storage unit 14, and the data based on a press detected by the press detection unit 13 at predetermined intervals. Here, the control unit 15 determines whether the detected press-based data, after satisfying the cancellation standard a, decreases without exceeding the execution standard B (step S304). When it is determined that the detected press-based data, after satisfying the cancellation standard a, decreases without exceeding the execution standard B (YES at step S304), the control unit 15 executes the operation to cancel the display of the map at the magnification ratio A and displays the original view of the map in full screen on the display unit 12 (step S305).

Cancellation of the operation A may be executed at any of the following timings: immediately after the data based on a press detected by the press detection unit 13 decreases after satisfying the cancellation standard a; at the point when the press-based data further decreases to become lower than the cancellation standard a; or when the finger is released from the input face of the contact detection unit 11.

On the other hand, when the operator, after the map magnified at the magnification ratio A is displayed on the display unit 12, further presses the input face intending to further magnify the map and the control unit 15 detects a further increase in the detected press-based data after satisfying the cancellation standard a (NO at step S304), the control unit 15 compares the execution standard B and the data based on a press detected by the press detection unit 13 at predetermined intervals. Then, the control unit 15 determines whether the data based on a press detected by the press detection unit 13 satisfies the execution standard B stored in the storage unit 14 (step S306). When it is determined that the detected press-based data satisfies the execution standard B (YES at step S306), the control unit 15 executes the operation B for magnifying the map at the magnification ratio B by generating magnified map information at the magnification ratio B centered on the position information obtained from the contact detection unit 11 and has the display unit 12 display the magnified map (step S307).

On the other hand, when it is determined that the detected press-based data does not satisfy the standard B (NO at step S306), the control unit 15 returns to step S303 and maintains the map magnified at the magnification ratio A displayed on the display unit 12.

Next, it is assumed that the operator further presses the input face intending to cancel the operation B. At this time, the control unit 15 compares the cancellation standard b and the execution standard C, both of which are retrieved from the storage unit 14, and the data based on a press detected by the press detection unit 13 at predetermined intervals. Here, the control unit 15 determines whether the detected press-based data, after satisfying the cancellation standard b, decreases without exceeding the execution standard C (Step S308). When it is determined that the detected press-based data, after satisfying the cancellation standard b, decreases without exceeding the execution standard C (YES at step S308), the control unit 15 executes an operation to cancel a display of the map magnified at the magnification ratio B and has the display unit 12 display the map magnified at the magnification ratio A, which is the map prior to the map magnified at the magnification ratio B (that is, the control unit 15 executes a reduction operation) (step S309). When it is determined that the detected press-based data, after satisfying the cancellation standard b, decreases without exceeding the execution standard C, the control unit may execute an operation to cancel the display of the map at the magnification ratios A and B and display the original view of the map in full screen on the display unit 12.

On the other hand, when the operator, after the map is magnified at the magnification ratio B and displayed on the display unit 12, further presses the input face intending to further magnify the map and the control unit 15 detects the further increase in the detected press-based data after satisfying the cancellation standard b (NO at step S308), the control unit 15 compares the execution standard C and the data based on a press detected by the press detection unit 13 at predetermined intervals. Then, the control unit 15 determines whether the data based on a press detected by the press detection unit 13 satisfies the execution standard C stored in the storage unit 14 (step S310). When it is determined that the detected press-based data satisfies the execution standard C (YES at step S310), the control unit 15 executes the operation C for magnifying the map at the magnification ratio C by generating magnified map information at the magnification ratio C centering on the position information obtained from the contact detection unit 11 and has the display unit 12 display the magnified view of the map at the magnification ratio C (step S311).

On the other hand, when it is determined that the detected press-based data does not satisfy the standard C (NO at step S310), the control unit 15 returns to step S307 and maintains the map magnified at the magnification ratio B displayed on the display unit 12.

Next, it is assumed that the operator further presses the input face intending to cancel the operation C. At this time, the control unit 15 compares the cancellation standard c retrieved from the storage unit 14 and the data based on a press detected by the press detection unit 13 at predetermined intervals. Here, the control unit 15 determines whether the detected press-based data decreases after satisfying the cancellation standard c (Step S312). When it is determined that the detected press-based data decreases after satisfying the cancellation standard c (YES at step S312), the control unit 15 executes an operation to cancel the display of the map magnified at the magnification ratio C and has the display unit 12 display the map magnified at the magnification ratio B, which is the map prior to the map at the magnification ratio C (that is, the control unit 15 executes the reduction operation) (step S313). When it is determined that the detected press-based data decreases after satisfying the cancellation standard c, the control unit 15 may execute the operation to cancel all of the operations to display the map at the magnification ratios A, B and C and to have the display unit 12 display the original view of the map in full screen.

According to the electronic device 10 of the third embodiment, as described above, the control unit 15 sets the plurality of execution standards A, B and C for executing the predetermined operations based on the press-based data, as well as the plurality of cancellation standards a, b and c for canceling each of the predetermined operations. When the data based on a press detected by the press detection unit 13 satisfies the execution standard A, the execution standard B higher than the execution standard A, and the cancellation standard b for canceling the predetermined operation associated with the execution standard B and then decreases without satisfying the execution standard C higher than the execution standard B, the control unit 15 controls to execute the operation associated with the execution standard A.

Therefore, in order to cancel the predetermined operation executed based on the press-based data, the operator does not need any other operation than applying the press-based data satisfying the cancellation standard a (or b or c). Accordingly, the number of times to touch for canceling the predetermined operation is reduced and thus the operability is improved. Moreover, since a plurality of execution standards for executing the predetermined operations based on the press-based data and a plurality of cancellation standards for cancelling each of the predetermined operations are set, in magnifying operation of the map, for example, a single touch allows both of fine magnification in a gradual manner as a forward operation and reduction in the gradual manner as a backward operation. Thereby, the operability may be further improved.

Application Example of Third Embodiment

Figure 8:
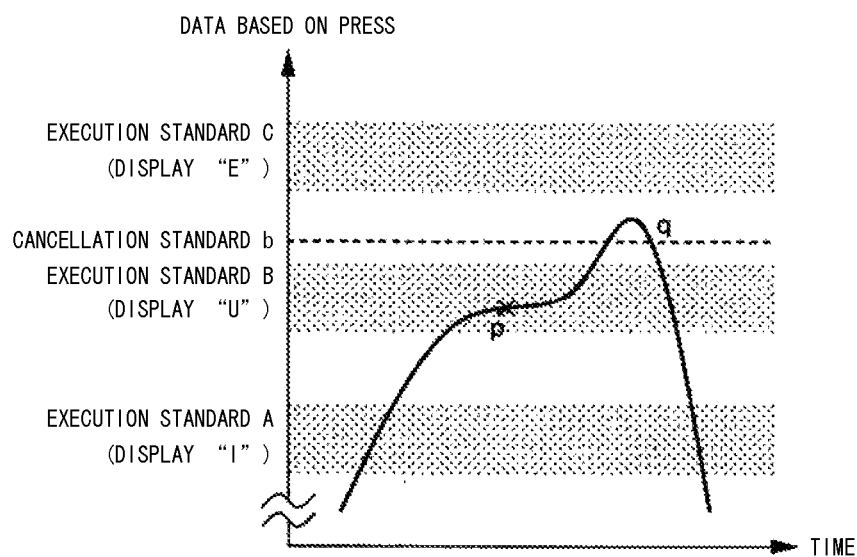
FIG. 8 is a graph illustrating execution standards and a cancellation standard used by the electronic device according to an application example of the embodiments 1-3.

Although the operations for magnifying the map based on the press-based data are used as examples in the above descriptions, the present embodiment may also be applicable to a character input operation. For example, FIG. 8 illustrates a graph indicating a relationship between execution standards for the character input operations and a cancellation standard. FIG. 8 illustrates an execution standard A for displaying a Japanese character "I", an execution standard B for displaying a Japanese character "U" and an execution standard C for displaying a Japanese character "E", each of which is shaded along a vertical axis. Also, a dotted line indicates the cancellation standard a for canceling confirmation of the operation to display the character "U". For example, when the data based on a press detected by the press detection unit 13 is within a shaded range of the execution standard in the figure, the control unit 15 executes an operation associated with the execution standard in the shaded range.

For example, it is assumed that the operator intends to display the character "I" on the display unit 12 but performs, by mistake, the pressing operation until the execution standard for displaying the character "U" is satisfied (at a point p). In this case, when the operator performs the pressing operation without satisfying the execution standard for displaying the character "E" and then the release operation (at a point q), the control unit 15 recognizes decrease in the data based on a press detected by the press detection unit 13 and controls the tactile sensation providing unit (not illustrated) to provide a tactile sensation by a vibration indicating cancellation of the operation while canceling confirmation of the operation to display the character "U", such that the operator is notified of restoring to a previous confirmation to display the character "I". As described in the second embodiment, alternatively, the operator may be notified of cancellation of the character input operation itself.

As described above, since a character input method for changing characters based on the press-based data enables cancellation of the operation without pressing another key, the operability may be improved. Further, since the tactile sensation is provided to indicate cancellation of the operation, convenience may be offered to the operator.

Although preferred embodiments are described above, it is to be understood that the scope of the present invention is not limited thereto. It will be understood by a person who is skilled in the art that the above embodiments may be changed or altered in a variety of manners. Such changes and alterations are also included in the scope of the present invention, as is clear from the Claims attached hereto.

EXPLANATION OF REFERENCE NUMERALS

10 Electronic device
11 Contact detection unit
12 Display unit
13 Press detection unit
14 Storage unit
15 Control unit

What is claimed is:

1. An electronic device for executing a predetermined operation based on a press comprising:
   a control unit configured to set an execution standard for executing the predetermined operation based on the press and a cancellation standard for canceling the predetermined operation, wherein
   the control unit sets the cancellation standard to be higher than the execution standard, and
   the control unit is configured to cancel the predetermined operation based on the cancellation standard and based on a decrease in the press.

2. The electronic device according to claim 1, comprising a press detection unit configured to detect a press, wherein
   the control unit sets a plurality of execution standards and a plurality of cancellation standards and, when the data based on the press detected by the press detection unit satisfies a first execution standard, a second execution standard higher than the first execution standard and the cancellation standard for canceling a predetermined operation associated with the second execution standard and then decreases without satisfying a third execution standard higher than the second execution standard and the cancellation standard, controls to execute a predetermined operation associated with the first standard.

3. An electronic device for executing a predetermined operation based on a press comprising:
   a control unit configured to set a plurality of execution standards for executing predetermined operations based on a press and a cancellation standard for simultaneously canceling the predetermined operations associated with the plurality of execution standards, wherein
   the predetermined operations are concurrently executed.

4. The electronic device according to claim 1, wherein the control unit is configured to execute the predetermined operation when data based on the press satisfies the execution standard, and configured to cancel the executed predetermined operation when the data satisfies the execution standard and the cancellation standard.

5. The electronic device according to claim 2, wherein
   the control unit is configured to execute the predetermined operation associated with the second execution standard when the data based on the press satisfies the first execution standard and the second execution standard; and
   the control unit is configured to cancel the executed predetermined operation associated with the second execution standard and to execute the predetermined operation associated with the first execution standard when the data based on the press satisfies the first execution standard, the second execution standard and the cancellation standard for canceling the predetermined operation associated with the second execution standard and then decreases without satisfying the third execution standard.

6. The electronic device according to claim 3, wherein the control unit is configured to execute the predetermined operations respectively when data based on the press satisfies the plurality of execution standards, and configured to cancel the executed predetermined operations when the data based on the press satisfies the cancellation standard.

7. An electronic device for executing a predetermined operation based on a press comprising:
   a control unit configured to set an execution standard for executing the predetermined operation based on the press and a cancellation standard for canceling the predetermined operation, wherein
   the control unit executes the predetermined operation when data based on the press satisfies the execution standard, and cancels the predetermined operation when the data satisfies the execution standard and the cancellation standard during execution of the predetermined operation and when the data indicates a decrease in the press, wherein
   the control unit sets the cancellation standard to be higher than the execution standard.

8. An electronic device for executing a predetermined operation based on a press, comprising:
   a control unit configured to set a plurality of execution standards and a plurality of cancellation standards and, when the data based on the press satisfies a first execution standard and a second execution standard higher than the first execution standard, execute a predetermined operation associated with the second execution standard, wherein
   the control unit is configured to cancel the predetermined operation associated with the second execution standard and execute a predetermined operation associated with the first execution standard when the data based on the press satisfies a cancellation standard and then decreases without satisfying a third execution standard higher than the second execution standard and the cancellation standard.

9. An electronic device for executing a predetermined operation based on a press comprising:
   a control unit configured to set a plurality of execution standards for executing predetermined operations based on a press and a cancellation standard for canceling the predetermined operations associated with the plurality of execution standards, wherein
   the control unit executes the predetermined operations when data based on the press satisfies the plurality of execution standards, and simultaneously cancels the predetermined operations when the data satisfies the plurality of execution standards and the cancellation standard during execution of the predetermined operations, wherein
   the predetermined operations are concurrently executed.

* * * * *